US009986864B2

(12) United States Patent
White et al.

(10) Patent No.: US 9,986,864 B2
(45) Date of Patent: Jun. 5, 2018

(54) SYSTEMS AND METHODS FOR SECURING CONTAINERS

(71) Applicants: Chad Ashley White, Richmond, CA (US); Dawn Felicity White, Richmond, CA (US)

(72) Inventors: Chad Ashley White, Richmond, CA (US); Dawn Felicity White, Richmond, CA (US)

( * ) Notice: Subject to any disclaimer, the term of this patent is extended or adjusted under 35 U.S.C. 154(b) by 0 days. days.

(21) Appl. No.: 15/470,855

(22) Filed: Mar. 27, 2017

(65) Prior Publication Data

US 2017/0273420 A1 Sep. 28, 2017

Related U.S. Application Data

(60) Provisional application No. 62/314,363, filed on Mar. 28, 2016.

(51) Int. Cl.

| | |
|---|---|
| ***A47G 29/08*** | (2006.01) |
| ***F16M 11/22*** | (2006.01) |
| ***F16M 13/02*** | (2006.01) |
| ***A47G 25/12*** | (2006.01) |
| ***F16M 13/08*** | (2006.01) |
| ***E05B 69/00*** | (2006.01) |

(52) U.S. Cl.

CPC .......... *A47G 29/083* (2013.01); *A47G 25/12* (2013.01); *E05B 69/00* (2013.01); *F16M 11/22* (2013.01); *F16M 13/02* (2013.01); *F16M 13/08* (2013.01); *F16M 2200/08* (2013.01)

(58) Field of Classification Search

CPC .... A45C 13/185; A47G 25/12; A47G 29/083; F16M 11/22; F16M 13/02; F16M 2200/08

USPC ..... 248/121, 126, 158, 176.1, 914, 305, 306

See application file for complete search history.

(56) References Cited

U.S. PATENT DOCUMENTS

| | | | | |
|---|---|---|---|---|
| D211,120 S * | 5/1968 | Sherbert | ...................... | D26/138 |
| D260,338 S * | 8/1981 | Savage | ...................... | D6/681.1 |
| D337,849 S * | 7/1993 | Bradley | ...................... | D26/138 |
| 5,797,569 A * | 8/1998 | Simons | .................... | G10G 5/00 248/121 |

* cited by examiner

*Primary Examiner* — Gwendolyn W Baxter

(74) *Attorney, Agent, or Firm* — Kang S. Lim

(57) ABSTRACT

An improved carrier for securely hanging containers with handles or slings in an accessible manner while providing anti-theft features which render removal of items more difficult by unauthorized person. One embodiment of the improved carrier is supported by an attached base, while another embodiment utilizes a table leg for support.

10 Claims, 13 Drawing Sheets

SYSTEMS AND METHODS FOR SECURING CONTAINERS

CROSS REFERENCE TO RELATED APPLICATIONS

This non-provisional application claims the benefit of provisional application No. 62/314,363, filed Mar. 28, 2016, which application is incorporated herein in its entirety by this reference.

BACKGROUND

The present invention relates to systems and methods for a carrier stand that can provide safety, convenience, and practicality to a user searching for a place to securely suspend one or more containers with handles or slings, such as purses, handbags, backpacks, camera cases, and other such containers in a non-obstructive and accessible location.

Guests attending social functions or patronizing businesses are often looking for a convenient and secure means to store their effects, in such a way that it is easily accessible and safe from potential snatch theft. The ground is often dirty or wet, and items left at one's feet are often unsecured. Using an extra seat for storage is often impractical, and leaves items exposed to sudden seizure by opportunistic thieves.

It is therefore apparent that an urgent need exists for carrier systems that can securely, non-obstructively hang containers with handles or slings. These improved carrier systems offer safety, convenience, and security by providing a security hanger from which to suspend a handled or slinged container or other similar gear.

SUMMARY

To achieve the foregoing and in accordance with the present invention, systems and methods for an improved carrier for hanging one or more handled or slinged containers are provided.

In one embodiment, a security carrier for hanging one or more handled or slinged containers, includes a vertical support, a hanger, a front stop and a retainer. The hanger is coupled to the vertical support, and is configured to suspend at least one container having a handle or a sling. The front stop is coupled to the hanger, and is configured to prevent the at least one container from slipping off a front end of the hanger. The retainer, coupled to the front stop, is configured to secure the container thereby preventing the at least one container from being easily snatched from the hanger. The carrier may also include a retainer extension coupled to the container retainer.

In some embodiments, the vertical support is stabilized by an attached base enabling standalone use. In other embodiments, the vertical support can be operatively coupled to furniture such as a table or a chair.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

In addition, as used in this specification and the appended claims, the singular article forms "a," "an," and "the" include both singular and plural referents unless the context of their usage clearly dictates otherwise. Thus, for example, reference to "a retainer" includes a plurality of retainers as well as a single retainer, and the like.

The present invention relates to systems and methods for an improved carrier stand that provides a safer and more convenient way to store bags, packs, luggage, gear, and other handle containers in a removed but accessible location.

Figure 1A:
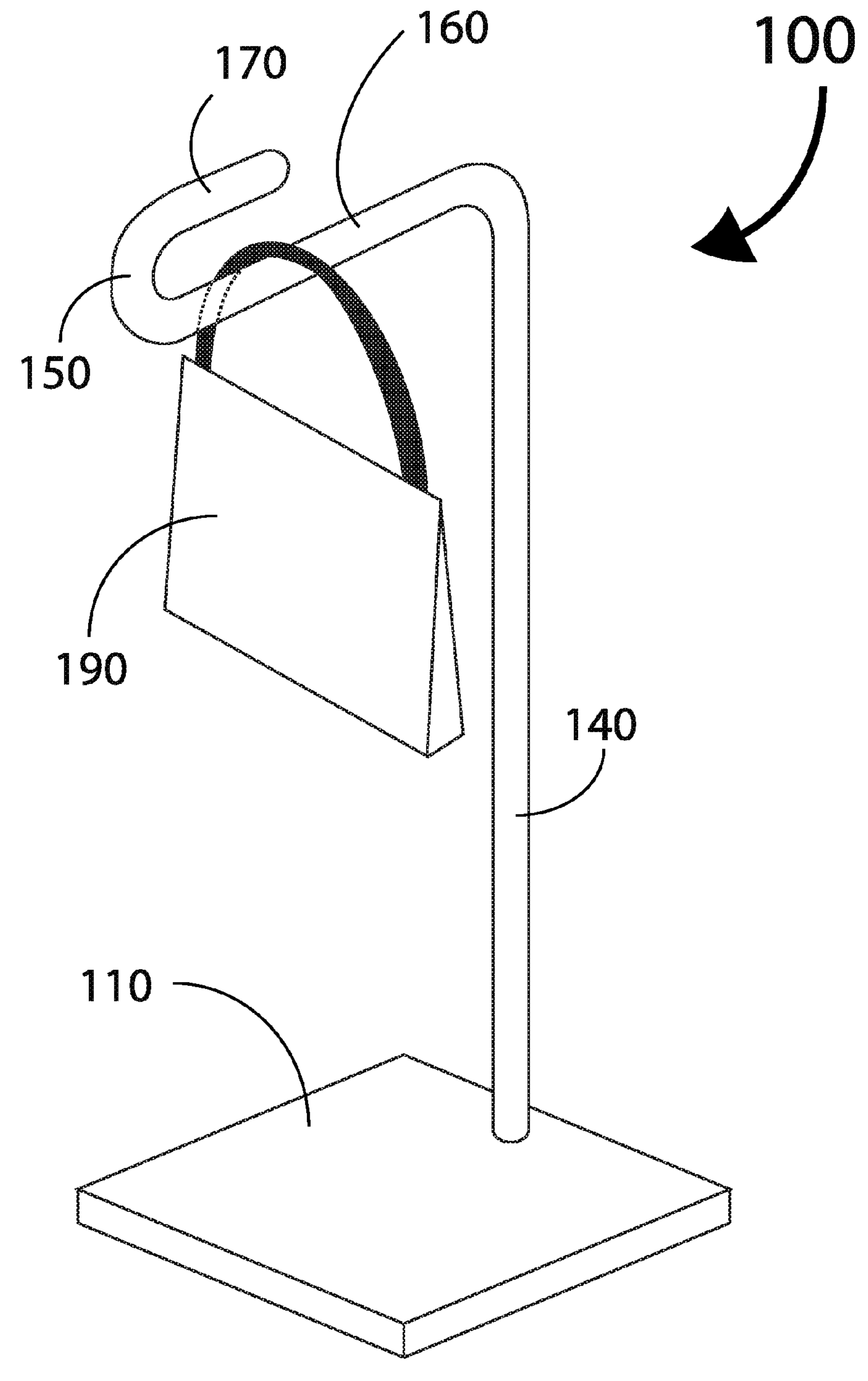
FIG. 1A depicts a perspective view of one embodiment of a carrier stand suspending a handled container.
Figure 1B:
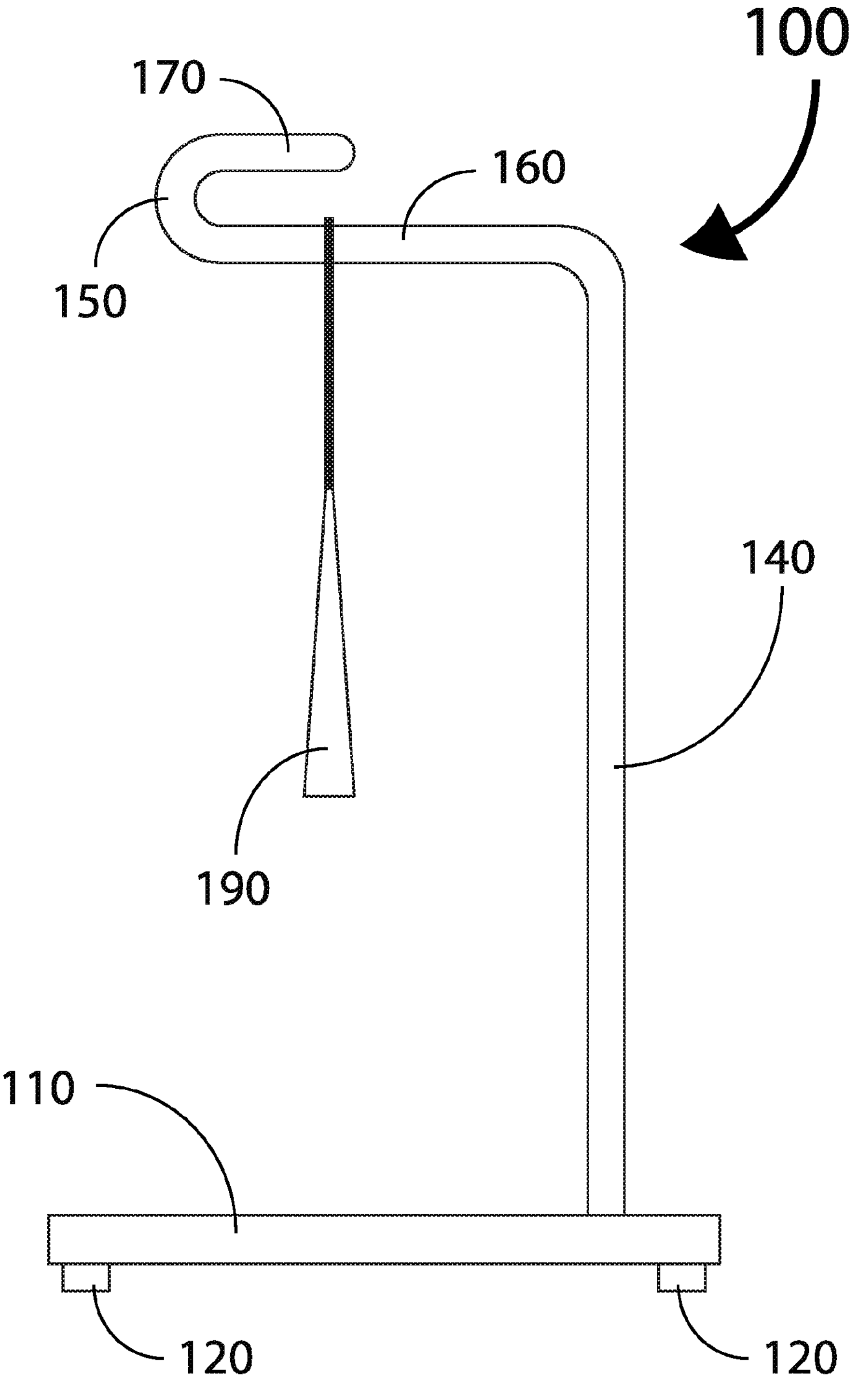
FIG. 1B is a side view of the embodiment of a carrier stand in accordance with the present invention.

To facilitate discussion, FIGS. 1A and 1B are perspective and side views illustrating one embodiment of a carrier stand 100 in accordance with the present invention. Carrier stand 100 includes a base 110, a vertical support 140, a container hanger 160, a front stop 150, and a retainer 170. One or more handled or slinged containers, for example, a handled container 190 such as a purse or handbag, can be suspended from container hanger 160, to demonstrate intended use.

Fastened to base 110, extending in a perpendicular fashion can be the substantially vertical support 140. At its other end, support 140 may be joined to the substantially horizontally-oriented container hanger 160 via an exemplary 'L' shaped bend as shown or via the addition of an elbow (not shown). The other end of hanger 160 may be coupled to one end of front stop 150. In turn, the other end of front stop 150 may be coupled to the retainer 170.

Retainer 170 prevents the handled container 190 from accidentally slipping off stand 100 when, for example, accidentally brushed by a passerby. The assembled stand 100 that results from the coupling of front stop 150, handled container hanger 160, and retainer 170 is intended to prevent snatching of the handled container 190, by a thief attempting to steal container 190 from the user.

Base 110 may be made from a variety of suitable materials, such as steel plate, aluminum plate, and wood. Vertical support 140, handled container hanger 160, and retainer 170, along with front stop 150, may be made from a variety of suitable materials, such as rebar, aluminum, and plastic. The segments 140, 150, 160 and 170 can be entirely or partially solid and/or hollow. The cross-sectional profile of segments 140, 150, 160 and 170 can be round, elliptical or polygonal.

In some embodiments, one or more pads 120 may be fastened to the bottom of base 110 to provide stability and/or traction. The pads 120 may be made from a variety of non-slip and/or impact absorbing materials, such as rubber or foam.

Figure 2:
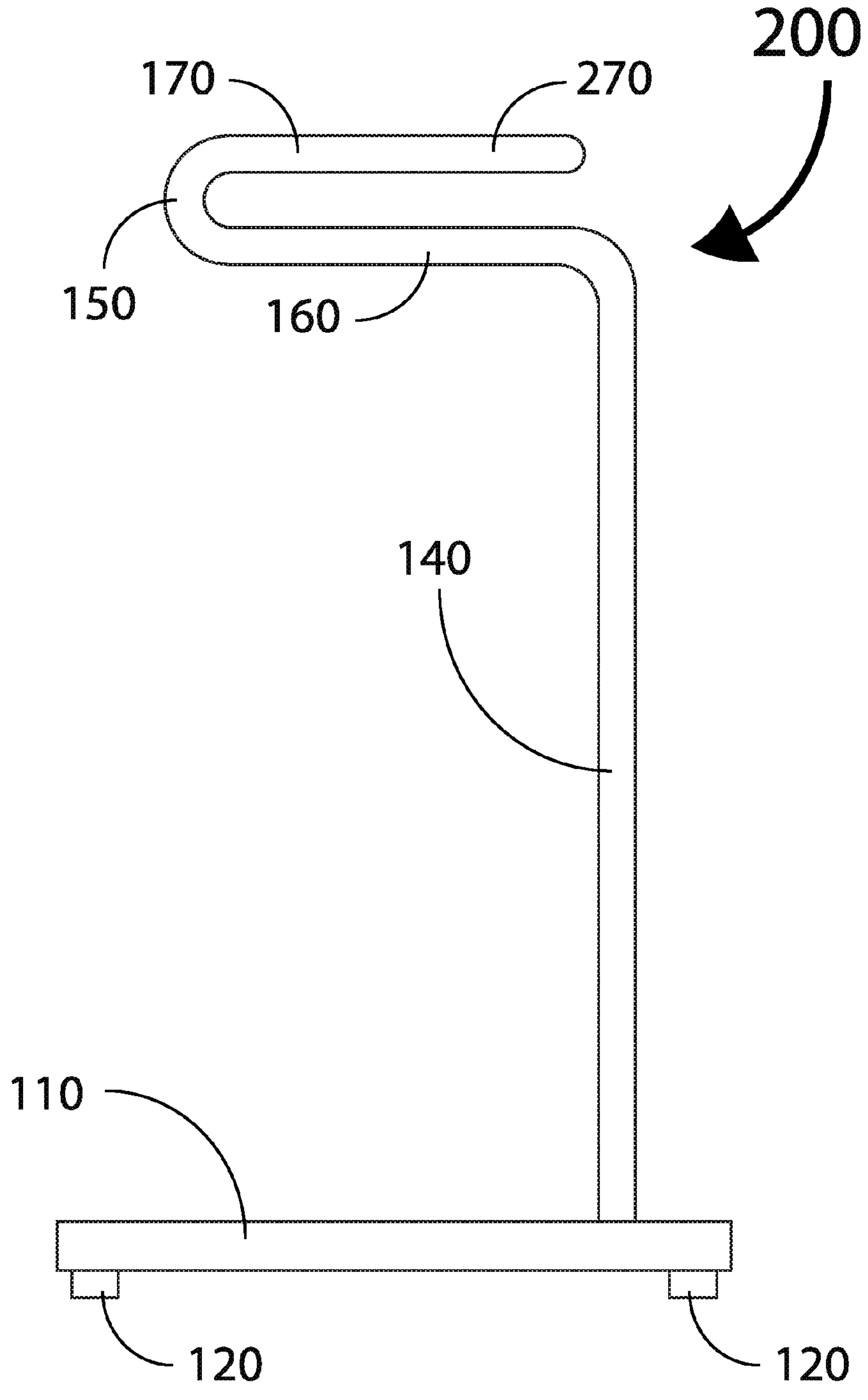
FIG. 2 depicts a side view of another embodiment of a carrier stand in accordance with the present invention.

FIG. 2 depicts a side view of another embodiment of a carrier stand 200 in accordance with the present invention. The stand 200 includes a base 110, a vertical support 140, a container hanger 160, a front stop 150, and a retainer 170. One or more handled and/or slinged containers (not shown) can be securely suspended from container hanger 160. In this embodiment, a modification has been made to stand 200, by way of the addition of a retainer extension 270, extending from the retainer 170. The existence of extension 270 increases the difficulty for a potential thief to snatch a handled container hanging from the carrier stand 200.

Figure 3A:
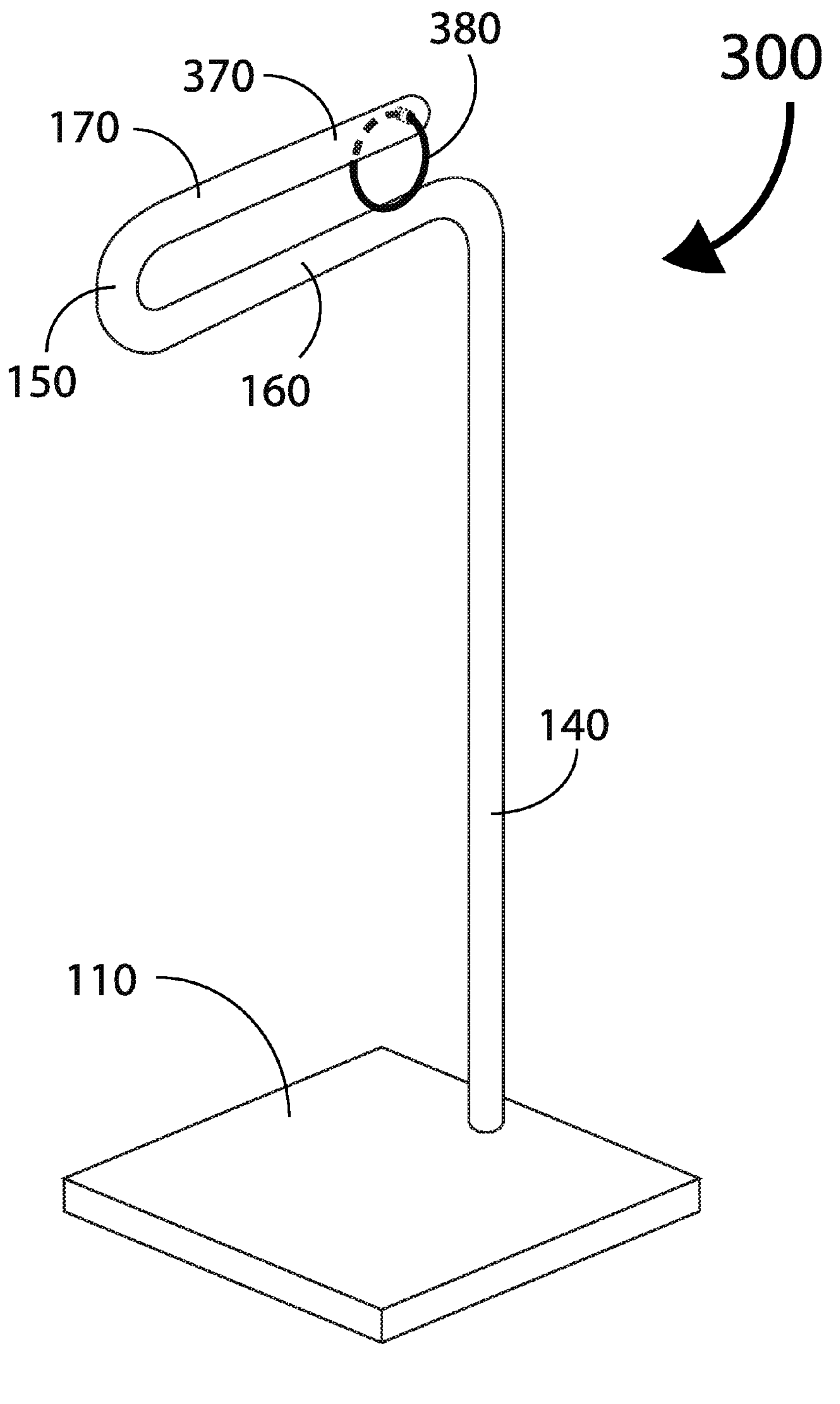
FIGS. 3A and 3B depict perspective and side views, respectively, of yet another embodiment of a carrier.
Figure 3B:
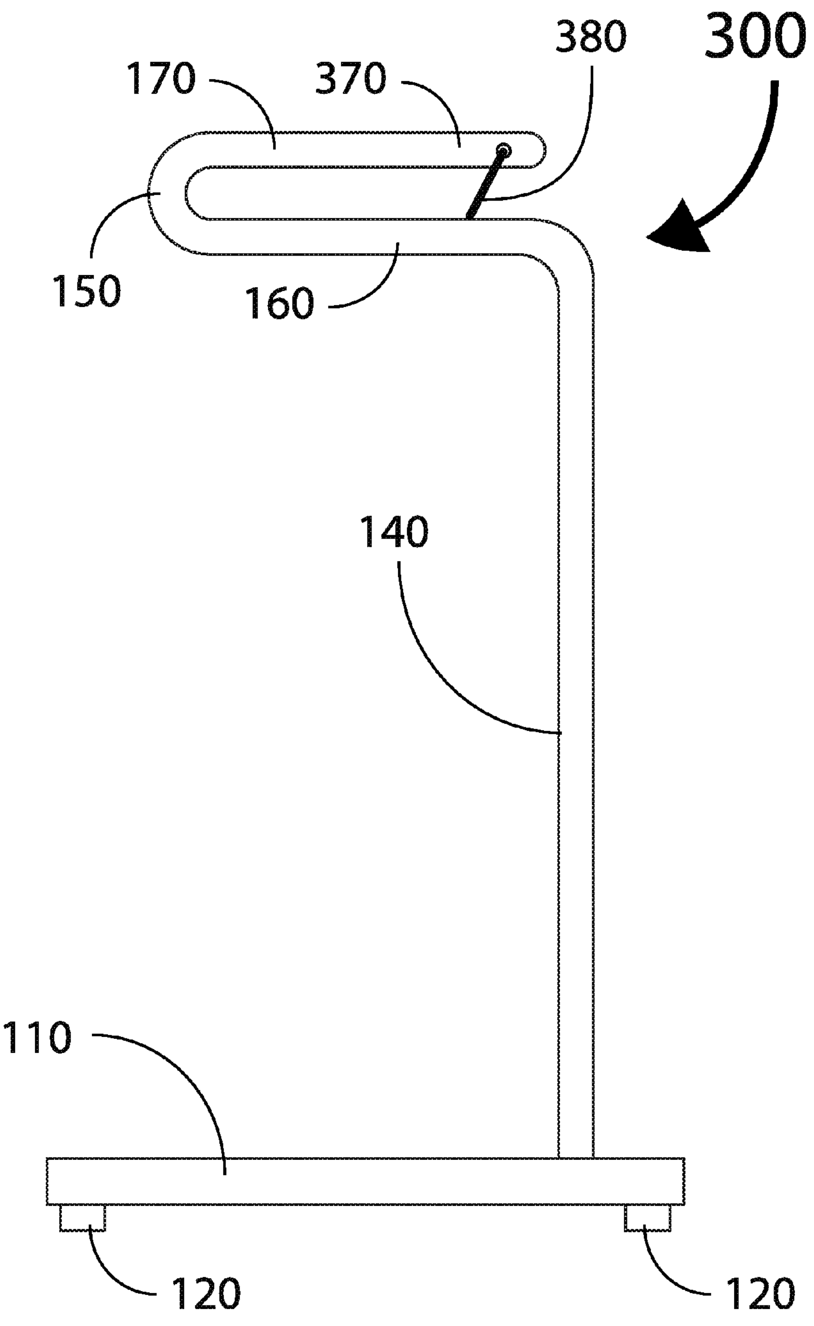

FIGS. 3A and 3B are perspective and side views, respectively, depicting yet another embodiment of a carrier stand 300. The stand 300 includes a base 110, a vertical support 140, a container hanger 160, a front stop 150, a retainer 170 and a retainer extension 370. One or more handled/slinged containers (not shown) can be securely suspended from container hanger 160. In this embodiment, stand 300 is further modified to include a rotatable backstop 380, for example, a key ring, operatively coupled to the retainer extension 370, to further prevent easy removal of a handled container (not shown) from the carrier stand 300.

FIG. 3B further illustrates how backstop 380 rests at an angle away from a vertical axis on hanger 160, and how backstop 380 can be lifted to release a handled container from the carrier stand 300. Because backstop 380 has to be manually lifted in order to release a handled container from stand 300, the resulting structure of modified stand 300 functions as a deterrence to potential snatch thieves from easily removing handled container(s) from the carrier stand 300.

Figure 4:
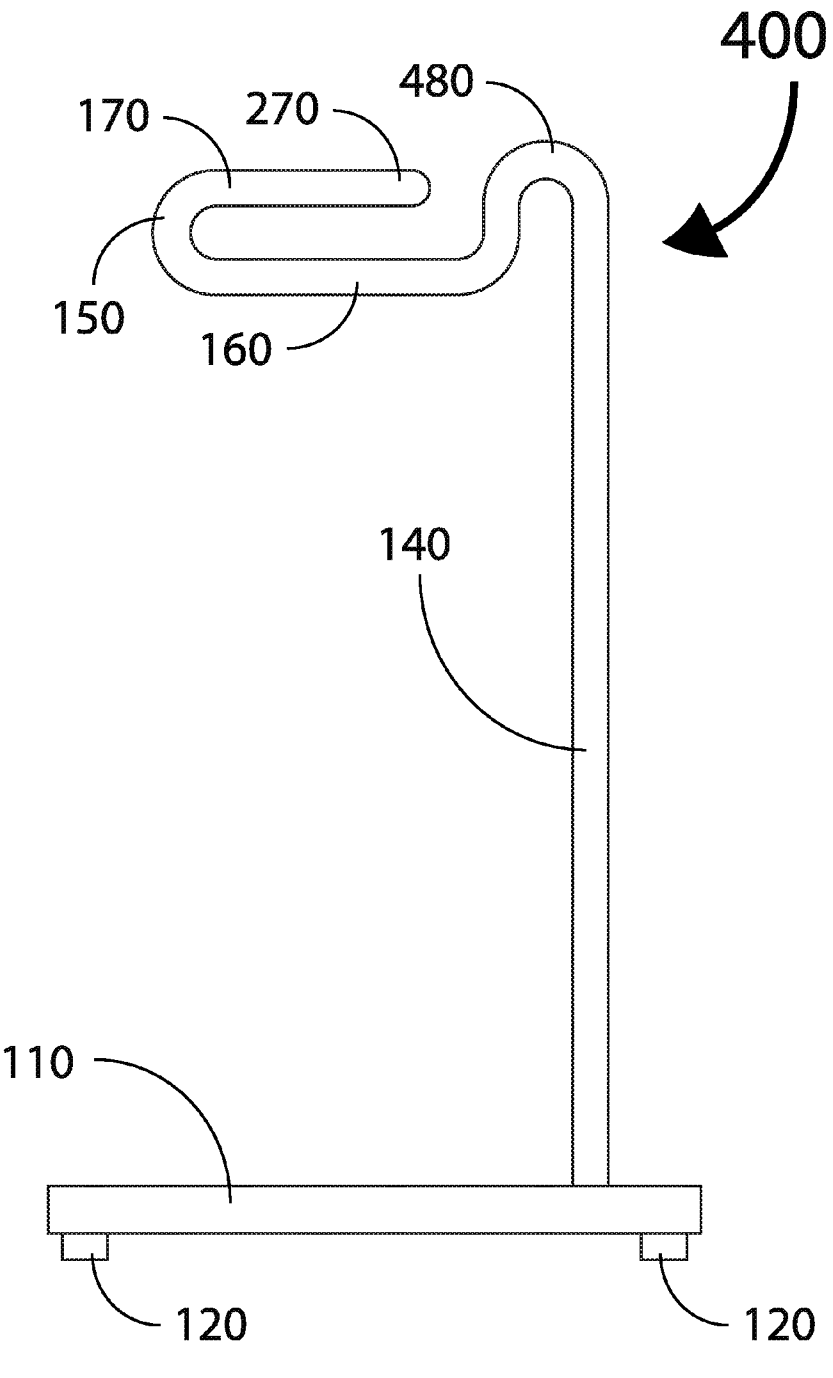
FIGS. 4 and 5 depict a side view and a perspective view, respectively, of two additional embodiments of carrier stands in accordance with the present invention.

FIG. 4 depicts a side view of an additional embodiment of a carrier stand 400 in accordance with the present invention. Stand 400 includes a base 110, a vertical support 140, a container hanger 160, a front stop 150, a retainer 170 and a retainer extension 270. One or more handled/slinged containers (not shown) can be securely suspended from container hanger 160.

In this embodiment, an enhancement has been made to the handled container hanger 160 by way of a backstop 480. Backstop 480 may take the form of one or more bends between hanger 160 and vertical support 140, thereby preventing the handle(s) and/or sling(s) of handled container(s) from slipping off hanger 160. The angle of each bend in backstop 480 may vary, as may the length of each subsequent segment resulting from the bends.

Figure 5:
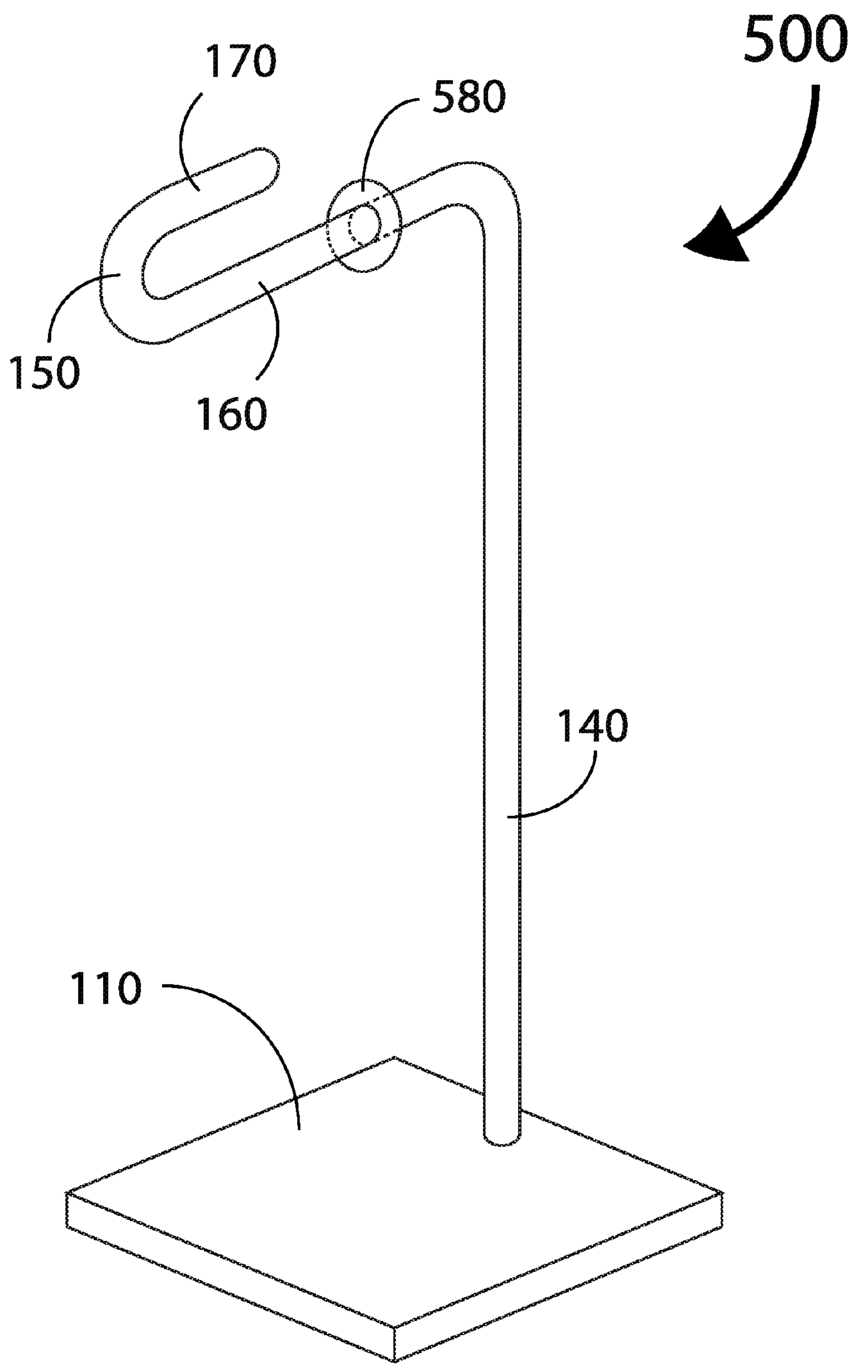

FIG. 5 is a perspective view illustrating an additional embodiment of a carrier stand 500 in accordance with the present invention. Stand 500 includes a base 110, a substantially vertical support 140, a container hanger 160, a front stop 150 and a retainer 170. Stand 500 may be modified to also include a retainer extension (not shown) coupled to retainer 170. One or more handled/slinged containers (not shown) can be securely suspended from container hanger 160.

In this embodiment, an enhancement has been made to the handled container hanger 160 by way of a backstop 580, for example, an "O" shaped ring. Backstop 580 provides a physical barrier to prevent the handles or slings of container (s) from slipping off of the backend of hanger 160. The backstop 580 may be secured to hanger 160 by tension (as shown) or by a set screw (not shown). Backstop 580 can take the form of a variety of sizes and shapes, and may be constructed from a variety of suitable materials, such as rubber or aluminum.

Figure 6A:
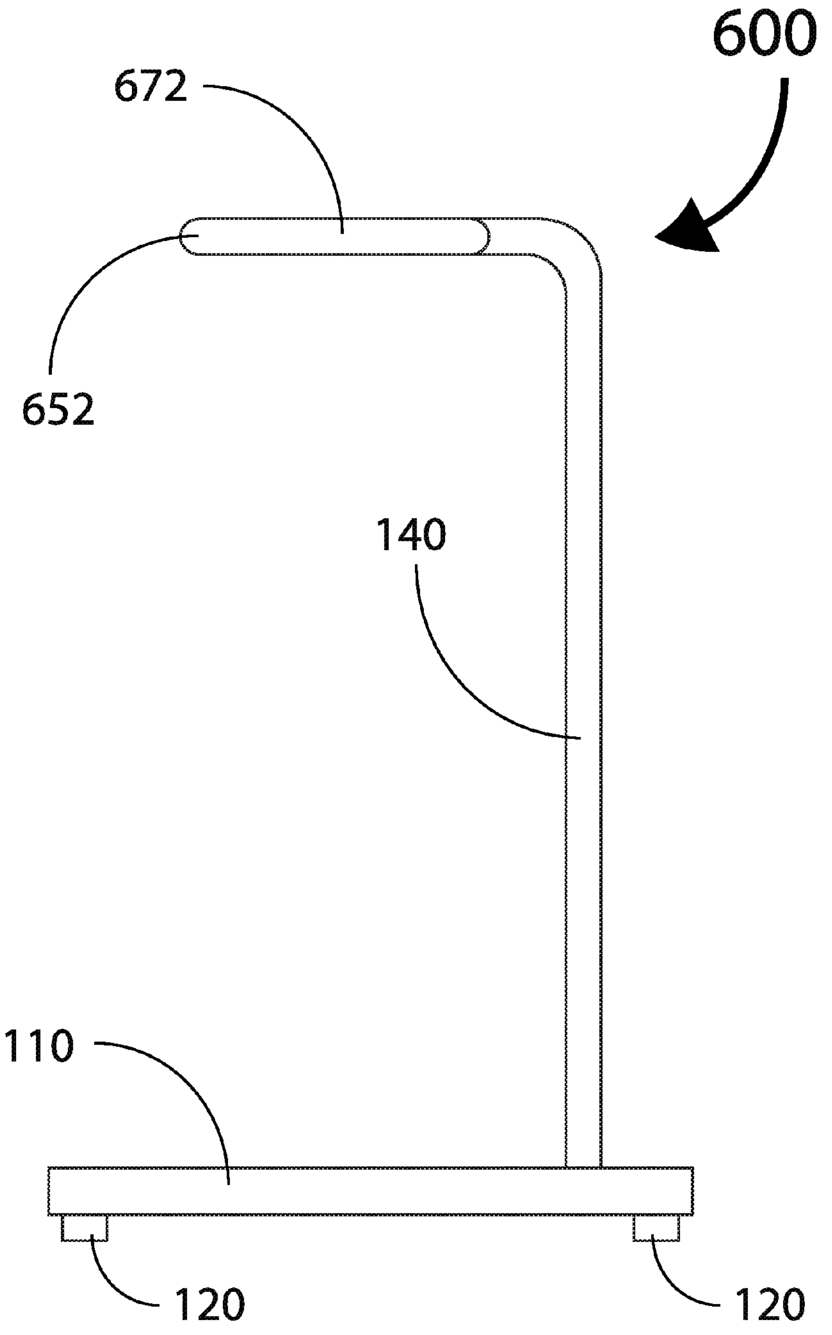
FIGS. 6A and 6B are side and top views illustrating yet another embodiment of a carrier stand in accordance with the present invention.
Figure 6B:
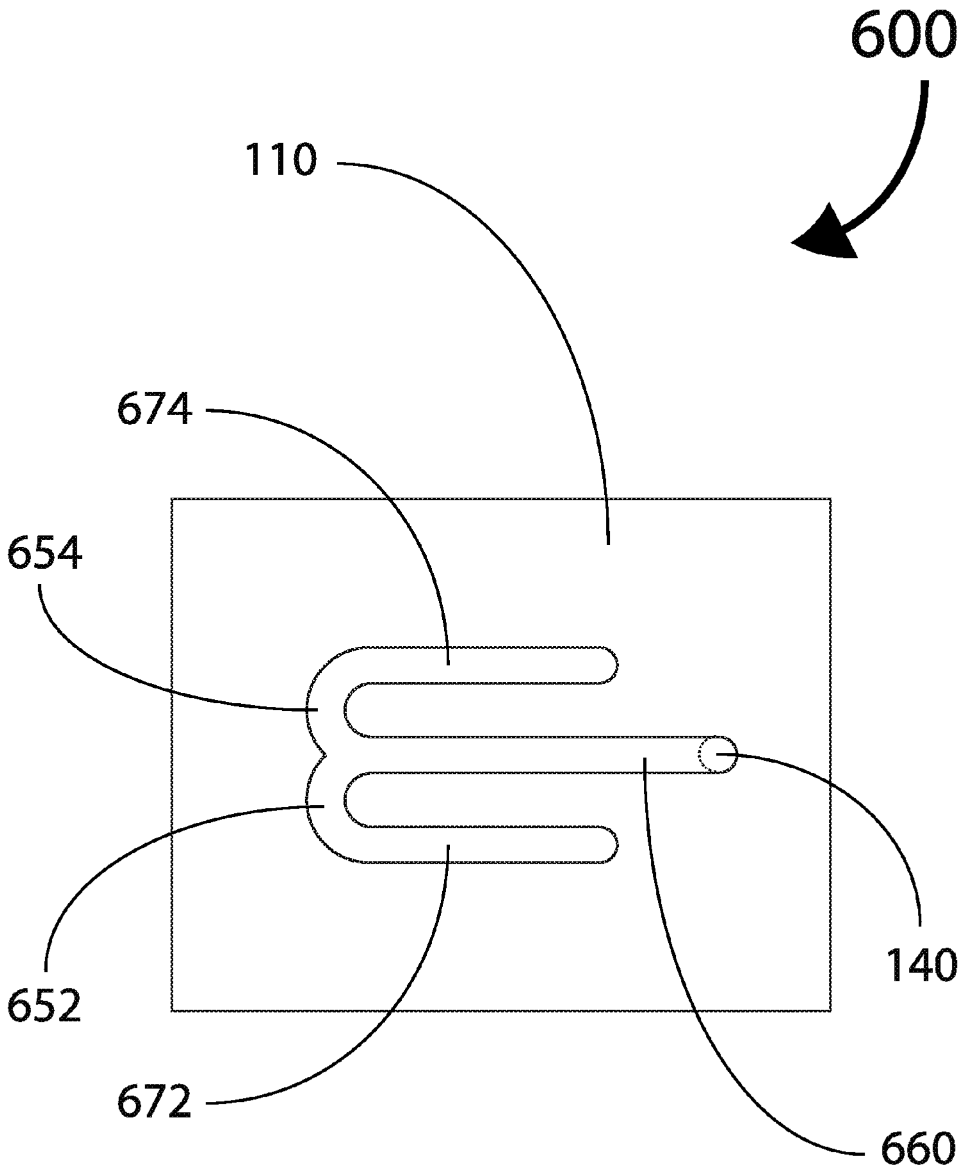

FIGS. 6A and 6B depict side and top views of an additional embodiment of a carrier stand 600 in accordance with the present invention. Stand 600 includes a base 110, a vertical support 140 and a substantially horizontally-oriented container hanger 660. One or more handled and/or slinged containers (not shown) can be securely suspended from container hanger 660.

The stand 600 features multiple container retainers 672 and 674, which can be oriented on a plane substantially parallel to the base 110. Hanger 660 is coupled to vertical support 140 at one end. At its other end, corresponding front stops 652 and 654 extend on a plane that is substantially parallel to the base 110. Extending from front stops 652 and 654 are container retainers 672 and 674, respectively.

In some embodiments such as stand 600, the substantially horizontally-oriented dual retainers 672 and 674 arrangement can provide further functionality. For example, in addition to allowing one or more containers to be suspended from hanger 660, and the orientation of front stops 652 & 654 and container retainers 672 & 674 allows for the respective handles/slings of a container to be suspended from corresponding retainers 672 and 674, thereby holding the container open for easy content access.

Figure 7A:
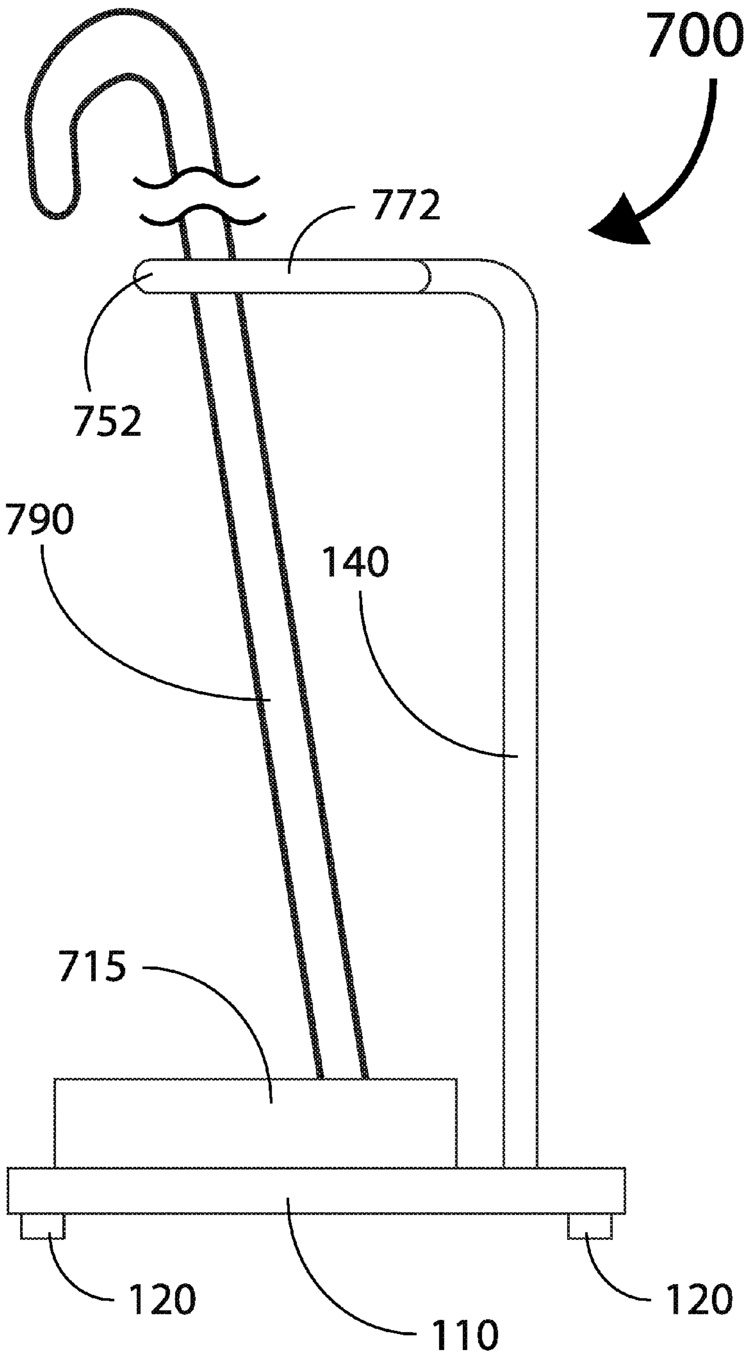
FIGS. 7A and 7B depict a side view and a top view, respectively, of yet another embodiment of a multi-purpose carrier stand in accordance with the present invention.
Figure 7B:
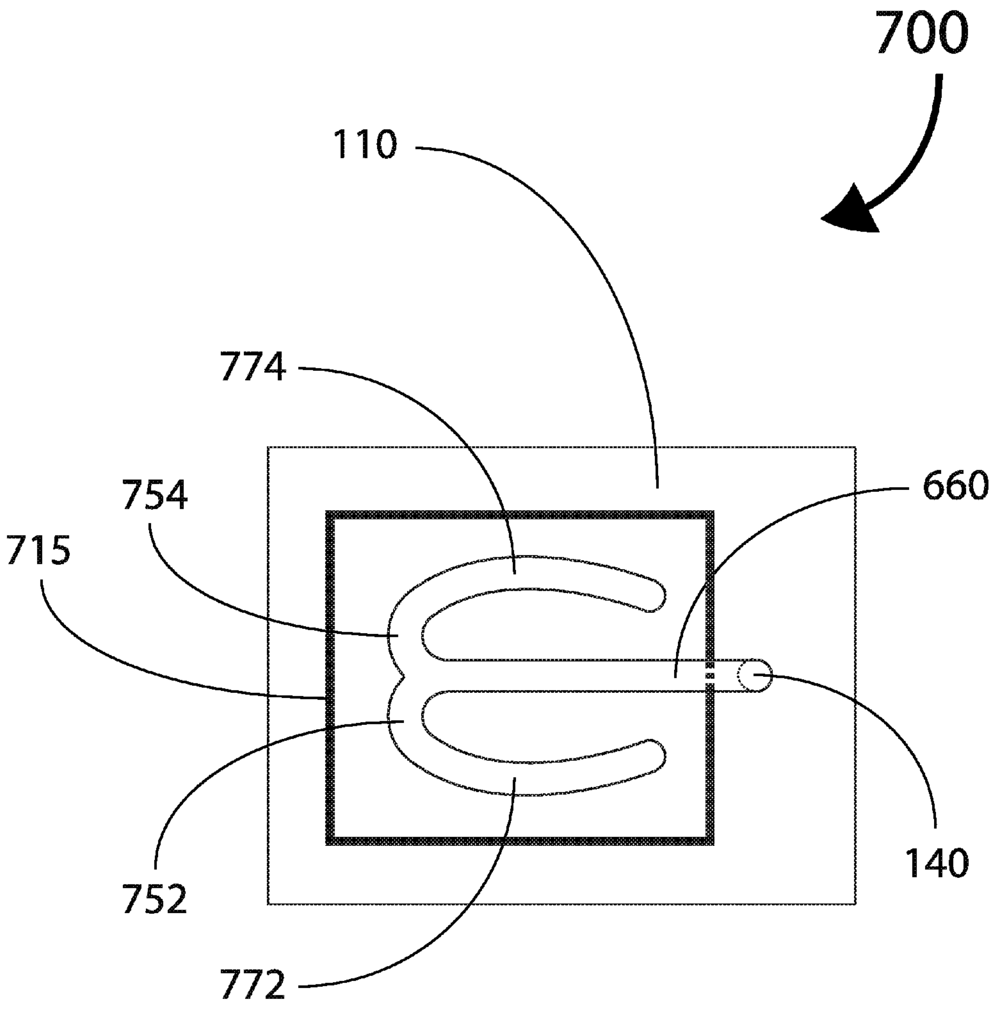

FIGS. 7A and 7B are side and top views illustrating yet another embodiment of a carrier stand 700 in accordance with the present invention. Stand 700 includes a base 110, a vertical support 140, a substantially horizontally-oriented container hanger 660 and a tray 715. Tray 715 is mounted to base 110, and can be constructed from a variety of suitable materials such as plastic, wood or aluminum. One or more handled and/or slinged containers (not shown) can be securely suspended from container hanger 660.

The stand 700 includes curved container retainers 772 and 774, which can be oriented on a plane substantially parallel to the base 110. Hanger 660 is coupled to vertical support 140 at one end. At its other end, corresponding front stops 752 and 754 extend on a plane that is substantially parallel to the base 110. The curved container retainers 772 and 774 extend from their respective front stops 752 and 754.

In this embodiment, the shapes of curved retainers 772 and 774 allows stand 600 to be multi-functional. For example, in addition to allowing one or more containers to be suspended from hanger 660, and the orientation of front stops 752 & 754 and the curvature of container retainers 772 & 774 enables stand 700 to accommodate one or more elongated accessories such a walking stick 790 (as shown in FIG. 7B) and/or an umbrella (not shown). The tray 715 is intended to, for example, house a distal end of the elongated accessory thereby providing additional stability.

Figure 8:
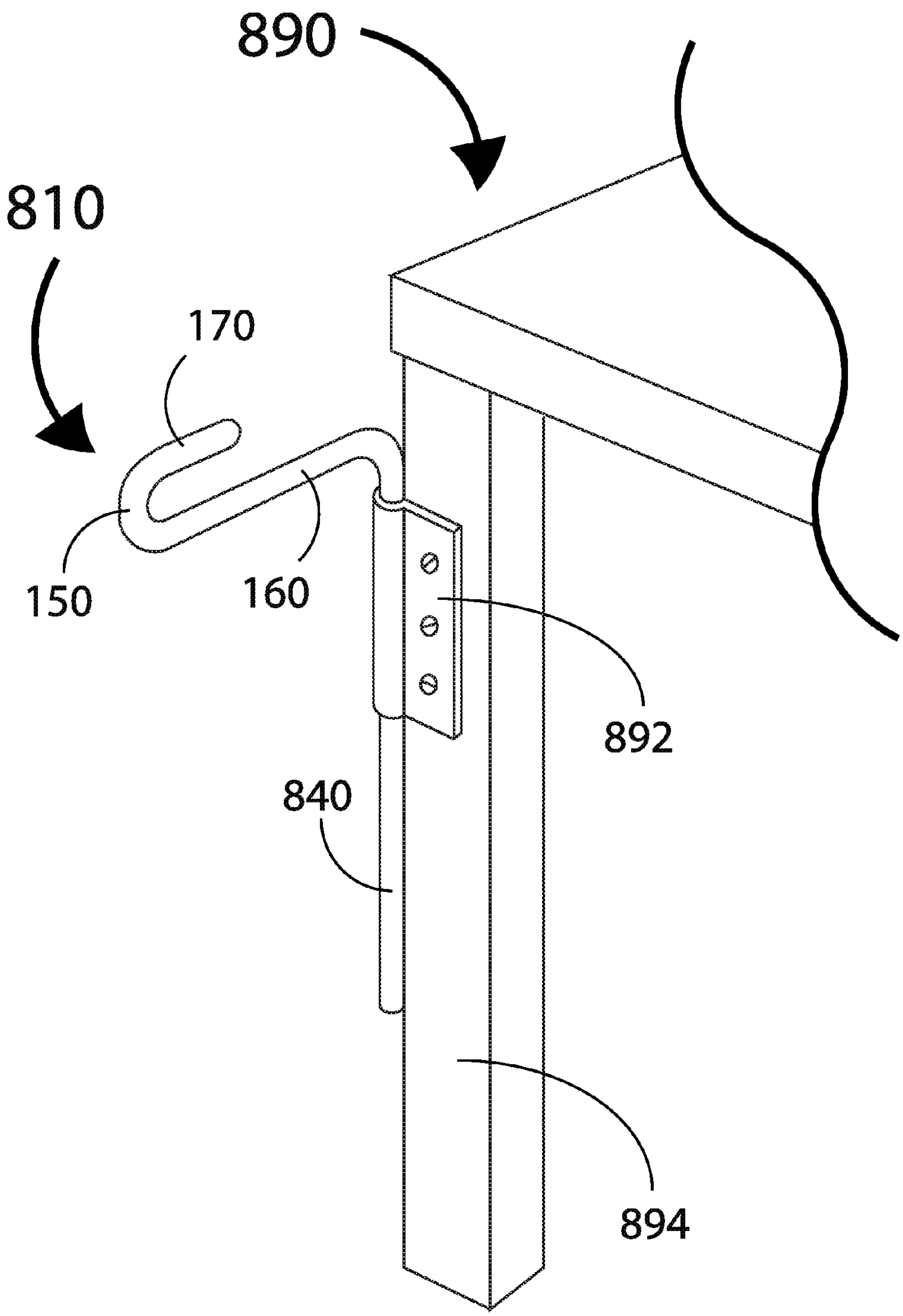
FIGS. 8 and 9 depict perspective views of two embodiments of furniture-mounted carrier stands in accordance with the present invention.

FIG. 8 depicts a perspective view of an embodiment of a container carrier 810 in accordance with the present invention. Carrier 810 includes a substantially vertical support 840, a container hanger 160, a substantially vertically-oriented front stop 150 and a container retainer 170.

Carrier 810 can be mounted to a table leg 894 of table 890 via a suitable bracket 892. Carrier 810 may be securely mounted to table leg 894 by other suitable fasteners such as a hook-and-loop fastener.

The carrier subassembly, comprising of container hanger 160, retainer 170 along with front stop 150, is coupled to vertical support 840. One or more handled and/or slinged containers (not shown) can be securely suspended from container hanger 160.

Bracket 892 securely anchors and orients carrier 810 with respect to table 890, while allowing for rotational movement along an axis of vertical support 840. By permitting this rotation, the carrier 810 can be swung out away from table leg 894 and be positioned appropriately while in use, and then secured out of the way while not in use.

Figure 9:
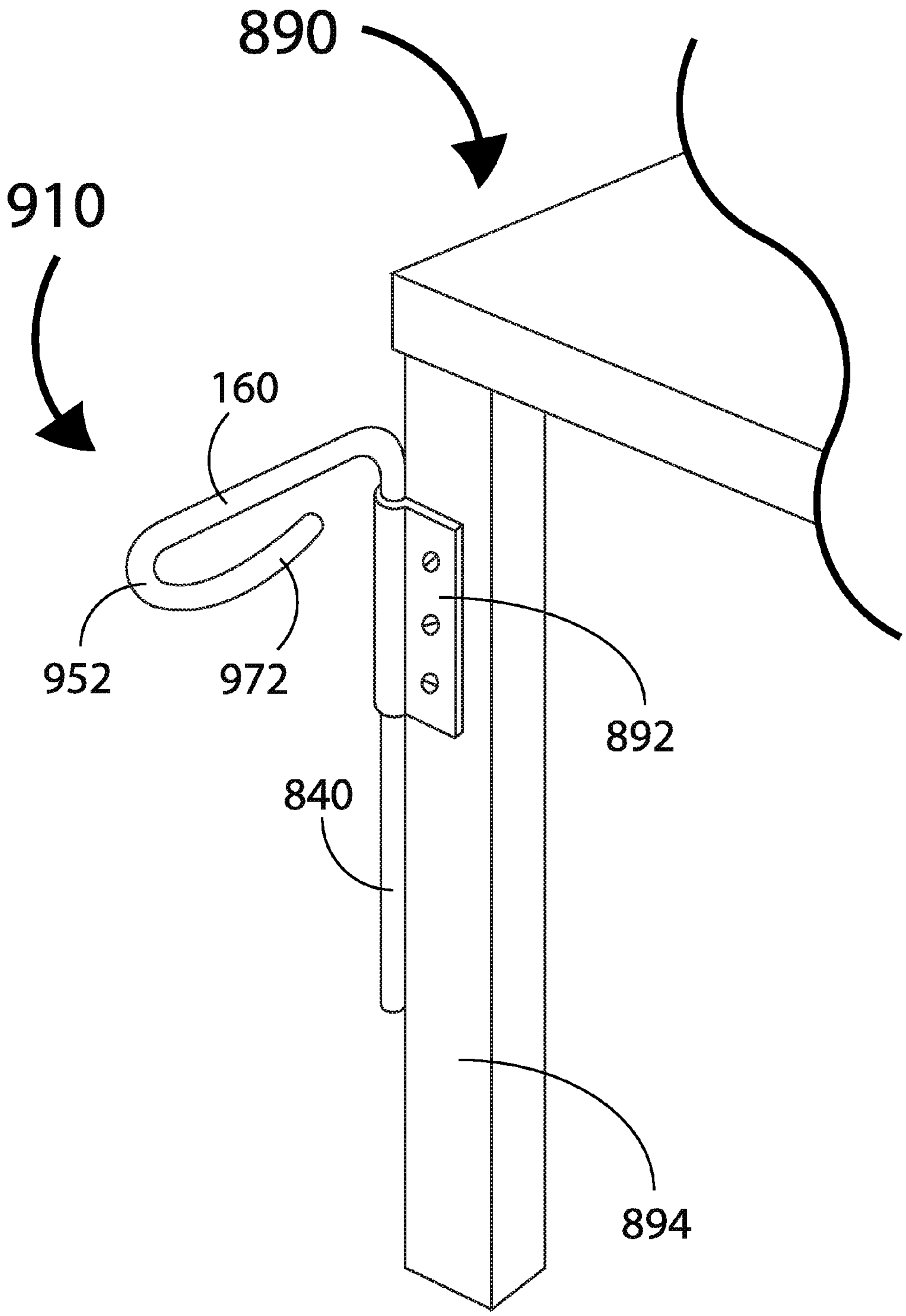

Referring now to FIG. 9, a perspective view of another embodiment of a container carrier 910 in accordance with the present invention. Carrier 910 includes a substantially vertical support 840, a container hanger 160, a substantially horizontally-oriented front stop 952 and a curved container retainer 972.

Carrier 910 can be mounted to a table leg 894 of table 890 via a suitable bracket 892. The subassembly, comprising of container hanger 160, retainer 170 along with front stop 150, is coupled to vertical support 840. One or more handled/slinged containers (not shown) can be securely suspended from container hanger 160.

Bracket 892 securely anchors and orients carrier 910 with respect to table 890, while allowing for rotational movement along an axis of vertical support 840. By permitting this rotation, the carrier 910 can be swung out away from table leg 894 and be positioned appropriately while in use, and then secured out of the way while not in use.

In this embodiment, the curved retainer 972 can also be substantially horizontally-oriented thereby enabling carrier 910 to be multi-functional, for example, to be able to securely accommodate one or more elongated accessories such as umbrella(s) and/or walking stick(s) (not shown).

Many modifications and additions are also possible. For example, instead of a table, the above described carriers, such as carriers 810 and 910, can be attached to other suitable furniture such as chairs (not shown).

In sum, the present invention provides systems and methods for improved carriers configured to secure handled and/or slinged container(s). The advantages include the ability to store items in a secure and non-obstructive location, while still enable hanging containers such as purses to be easily accessible and within eyesight of one or more of the owners.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A security carrier for hanging one or more handled or slinged containers, the carrier comprising:
- a vertical support;
- a hanger coupled to the vertical support, wherein the hanger is configured to suspend at least one container having a handle or a sling;
- a front stop coupled to the hanger, wherein the front stop is configured to prevent the at least one container from slipping off a front end of the hanger;
- a retainer coupled to the front stop, wherein the retainer is configured to secure the container thereby preventing the at least one container from being easily snatched from the hanger;
- a base coupled to and providing stability to the vertical support; and
- a backstop coupled to the hanger, wherein the backstop is configured to prevent the at least one container from slipping off a back end of the hanger, and wherein the backstop is a ring rotatably-coupled to the hanger and resting on the hanger at an angle to the vertical axis.

2. The carrier of claim 1 further comprising a retainer extension coupled to the retainer.

3. The carrier of claim 1 wherein the backstop includes a curved elevated segment.

4. The carrier of claim 1 wherein the front stop is horizontally oriented.

5. The carrier of claim 4 further configured to accommodate at least one elongated accessory.

6. A security carrier for hanging one or more handled or slinged containers, the carrier comprising:
- a vertical support;
- a hanger coupled to the vertical support, wherein the hanger is configured to suspend at least one container having a handle or a sling;
- a front stop coupled to the hanger, wherein the front stop is configured to prevent the at least one container from slipping off a front end of the hanger;
- a retainer coupled to the front stop, wherein the retainer is configured to secure the container thereby preventing the at least one container from being easily snatched from the hanger;
- a base coupled to and providing stability to the vertical support; and
- a backstop coupled to the hanger, wherein the backstop is configured to prevent the at least one container from slipping off a back end of the hanger, and wherein the backstop is an elastic ring configured to be secured by tension on the hanger.

7. The carrier of claim 6 further comprising a retainer extension coupled to the retainer.

8. The carrier of claim 6 wherein the backstop includes a curved elevated segment.

9. The carrier of claim 6 wherein the front stop is horizontally oriented.

10. The carrier of claim 9 further configured to accommodate at least one elongated accessory.

* * * * *